(12) United States Patent
Yeung et al.

(10) Patent No.: US 9,674,349 B2
(45) Date of Patent: Jun. 6, 2017

(54) SEAMLESS INTERWORKING OF CALL CONTROL BETWEEN AUTONOMOUS SYSTEMS

(75) Inventors: Michael Yeung, Nepean (CA); Tom Gray, Mansfield (CA)

(73) Assignee: Mitel Networks Corporation, Ottawa, Ontario (CA)

( * ) Notice: Subject to any disclaimer, the term of this patent is extended or adjusted under 35 U.S.C. 154(b) by 124 days.

(21) Appl. No.: 13/317,478

(22) Filed: Oct. 18, 2011

(65) Prior Publication Data

US 2013/0094408 A1    Apr. 18, 2013

(51) Int. Cl.
*H04W 4/00* (2009.01)
*H04M 3/42* (2006.01)
*H04L 29/06* (2006.01)
*H04M 3/56* (2006.01)
*H04W 76/02* (2009.01)

(52) U.S. Cl.
CPC .... *H04M 3/42246* (2013.01); *H04L 65/1016* (2013.01); *H04L 65/1053* (2013.01); *H04L 65/403* (2013.01); *H04M 3/56* (2013.01); *H04W 76/026* (2013.01); *H04M 3/42263* (2013.01); *H04M 2203/2094* (2013.01); *H04M 2250/06* (2013.01)

(58) Field of Classification Search
CPC .......... H04W 36/0022; H04W 36/0027; H04L 47/767; H04L 67/148
USPC .................................................. 370/331, 338
See application file for complete search history.

(56) References Cited

U.S. PATENT DOCUMENTS

| | | | |
|---|---|---|---|
| 7,516,410 B2 * | 4/2009 | Thompson | G06F 3/0481 715/753 |
| 8,208,944 B2 * | 6/2012 | Kim et al. | 455/456.1 |
| 2002/0093931 A1 * | 7/2002 | Dalal | 370/342 |
| 2004/0221323 A1 * | 11/2004 | Watt | H04N 7/15 725/135 |
| 2005/0149764 A1 * | 7/2005 | Bahl et al. | 713/202 |
| 2006/0217112 A1 * | 9/2006 | Mo | 455/422.1 |
| 2008/0009324 A1 * | 1/2008 | Patel | 455/566 |
| 2008/0232574 A1 * | 9/2008 | Baluja et al. | 379/221.02 |
| 2009/0017865 A1 | 1/2009 | Cole et al. | |

(Continued)

FOREIGN PATENT DOCUMENTS

WO    WO 2009/064182 A1    5/2009

*Primary Examiner* — Shaq Taha
*Assistant Examiner* — Ryan Kavleski

(57) ABSTRACT

The present disclosure relates to communications, and more particularly, to a seamless interworking of call control between autonomous systems. In an illustrative embodiment, an electronic device is provided. The electronic device can be connected to multiple autonomous networks, for example, a private network through a Private Branch Exchange and a public network through a Public Switched Telephone Network. The user device can have multiple network interfaces. Alternatively, there can be one network interface to access the autonomous networks. These networks each can provide unique collaboration services. Collaboration services can include, but are not limited to, associations, roles, availability and features. The electronic device can setup connections and initialize a call through both networks. Through the device, each of the networks can add or delete participants to the call under the direction of the user. The networks can also provide the user device with suitable feature keys.

10 Claims, 2 Drawing Sheets

(56) References Cited

U.S. PATENT DOCUMENTS

| | | | |
|---|---|---|---|
| 2009/0089379 A1* | 4/2009 | Pegg | G06F 9/54 709/206 |
| 2009/0129301 A1* | 5/2009 | Belimpasakis | 370/310 |
| 2009/0170519 A1 | 7/2009 | Wilhoite et al. | |
| 2010/0075642 A1 | 3/2010 | Ejzak et al. | |
| 2011/0137991 A1* | 6/2011 | Russell | G06Q 10/06 709/204 |

* cited by examiner

SEAMLESS INTERWORKING OF CALL CONTROL BETWEEN AUTONOMOUS SYSTEMS

TECHNICAL FIELD

This disclosure generally relates to communications, and more particularly, to connecting multiple autonomous networks seamlessly for collaboration services.

BACKGROUND

Currently, there are a number of technologies that create user confusion. More importantly, however, there are opportunities to solve that confusion. Computer and communication networks can provide collaboration services which allow for connections at a higher level of semantics. Roles and associations can be defined which allow connections without knowledge of the address of particular endpoint devices. For example, a product expert, having a defined role, can be associated with a number of people. A salesperson in conference with a customer can request that the system conference having a product expert answer questions without requiring them to know the person assigned to the task or the address of the device which they are currently using. Similarly, groups of devices can be associated. Devices can also be associated with a user and with the function that they fulfill for that user. For example, a user can instruct that a call be moved to their desk phone from the current device which it is on. The system can be aware of the physical address of the desk phone and the user is not required to provide that information.

Another technology is the ability of user devices to connect to multiple networks. In one example, a user cellphone connects to both a private network of their employer and to a public network such as in a Bring Your Own Device (BYOD) model. A user can maintain one device and wish to use it for all their communication needs. As the user moves between employers, they can retain the same device and use it on the new employer's network.

The interoperation of these two technologies leads to user confusion. For example, a salesperson is talking to a customer and wishes to have a product expert join the conversation. The private network has defined the role of the product expert while the public network, having no relation to the employer's products, has no knowledge of this role. If the salesperson places this call on the employer's private network then they can be able to initiate the required conference. If, however, the call has been placed on the public network, then this option will not be available. The user can perceive, in both cases, that they are in a conference with a customer but will face confusion as to why they can sometimes access product experts and sometimes they cannot. Thus, the capability of allowing the roles and associations provided by all available networks to seamless interwork on a given call would be desirable but currently is not available.

An Internet Multimedia System (IMS) is being developed to deal with the issue of confusion between controllers in autonomous networks. Protocols have been set up so that calls originated in one autonomous zone can have their control signals routed back to the user's home zone. Protocols have been set up for the cooperation of the autonomous controllers in each zone to handle individual calls. The remote controller can operate at the Proxy-Call Session Control Function (P-CSCF) and the home controller can operate as the Serving-Call Session Control Function (S-CSCF). The home controller can offer features to the user. It can respond to home controller commands to set up network connections. This arrangement among the controllers can localize control and can eliminate ambiguities.

The IMS network is limited in addressing the ambiguity of control issues because it is designed for the user to obtain a single set of features provided by their home network. No matter where a user roams in the world, the user can receive features from their home network. However, there will be many cases in which this vision is not accurate. A user can have multiple identities and wish to receive services based on those identities. An example of this is a BYOD model in which a user can be expected to provide their telephone, computer, etc. for work. The model is commonly seen as being one in which the telephone can be at home on either a work or private personal proxy in order to receive the services appropriate for each role. The device can receive one set of features or the other. Nevertheless, IMS does not account for obtaining features spanning two or more networks regarding a single call. Furthermore, IMS is a large and costly system which is only now in its first stages of deployment. IMS requires new equipment and business arrangements between providers especially between public and private providers.

A need therefore exists for a system for seamless interworking of call control between autonomous systems that overcome those issues described above. These, as well as other related advantages, will be described in the present disclosure.

BRIEF DESCRIPTION OF DRAWINGS

The novel features believed to be characteristic of the disclosure are set forth in the appended claims. In the descriptions that follow, like parts are marked throughout the specification and drawings with the same numerals, respectively. The drawing FIGURES are not necessarily drawn to scale and certain FIGURES can be shown in exaggerated or generalized form in the interest of clarity and conciseness. The disclosure itself, however, as well as a preferred mode of use, further objectives and advantages thereof, will be best understood by reference to the following detailed description of illustrative embodiments when read in conjunction with the accompanying drawings, wherein:

DESCRIPTION OF THE DISCLOSURE

The description set forth below in connection with the appended drawings is intended as a description of presently preferred embodiments of the disclosure and is not intended to represent the only forms in which the present disclosure can be constructed and/or utilized. The description sets forth the functions and the sequence of steps for constructing and operating the disclosure in connection with the illustrated embodiments. It is to be understood, however, that the same or equivalent functions and sequences can be accomplished by different embodiments that are also intended to be encompassed within the spirit and scope of this disclosure.

The present disclosure relates to communications, and more particularly, to a seamless interworking of call control between autonomous systems. In one illustrative embodiment, an electronic device can connect with multiple autonomous networks when a call comes through. For example, the device can communicate first with a public network through a Public Switched Telephone Network (PSTN) and then a private network through a Private Branch Exchange (PBX). The user device can have multiple network interfaces. Alternatively, there can be one network interface to access the autonomous networks. These networks each can provide unique collaboration services. Through these services, the device can handle the call for control and media. The electronic device can setup connections and initialize conferences on both networks. Each of the networks can add or delete participants to the call under the direction of the user. The networks can also provide the user device with suitable feature keys.

Numerous advantages can be offered by the illustrative embodiment described above. Collaboration services from multiple networks can be utilized seamlessly. Furthermore, complex technological and business relationships can be set up. The features described herein can be used for smaller PBX installations and be integrated into major public network providers. Ambiguity of control between connected networks can be removed. Many additional advantages of the present disclosure will become apparent to those skilled in the relevant art as provided for in the following description.

Exemplary architectures for seamlessly interworking multiple autonomous networks will be described in FIGS. 1 and 3. FIG. 2 will provide exemplary procedures for establishing collaboration services through multiple network interfaces, while FIG. 4 discloses procedures for establishing collaboration services through a single network interface. In this disclosure, device can be referred to as a communication apparatus that can be mobile or not. The device can be a tablet, mobile phone, smartphone, personal digital assistant, handheld computer, standalone computer, conference device or the like.

Figure 1:
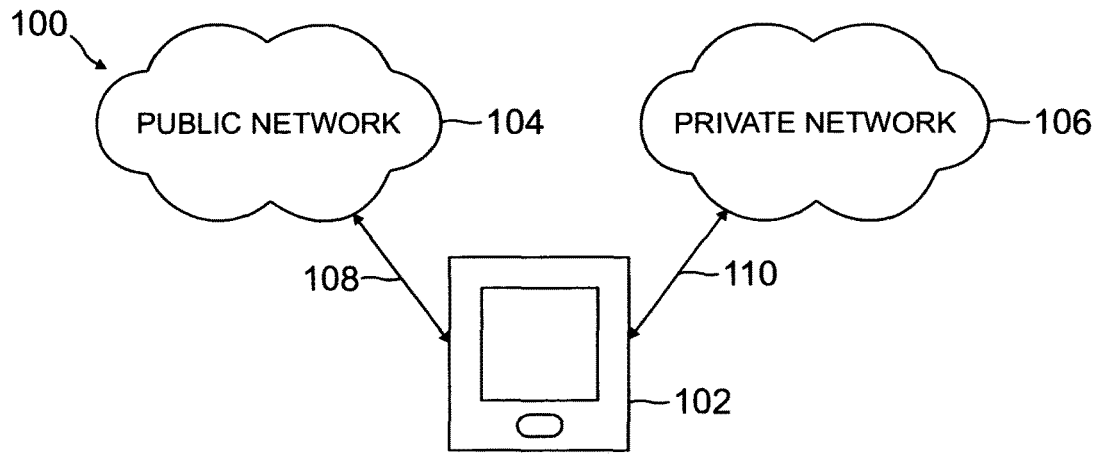
FIG. 1 is an exemplary architecture depicting seamless interworking of call control between autonomous networks through multiple interfaces in accordance with one or more aspects of the present disclosure.
Figure 2:
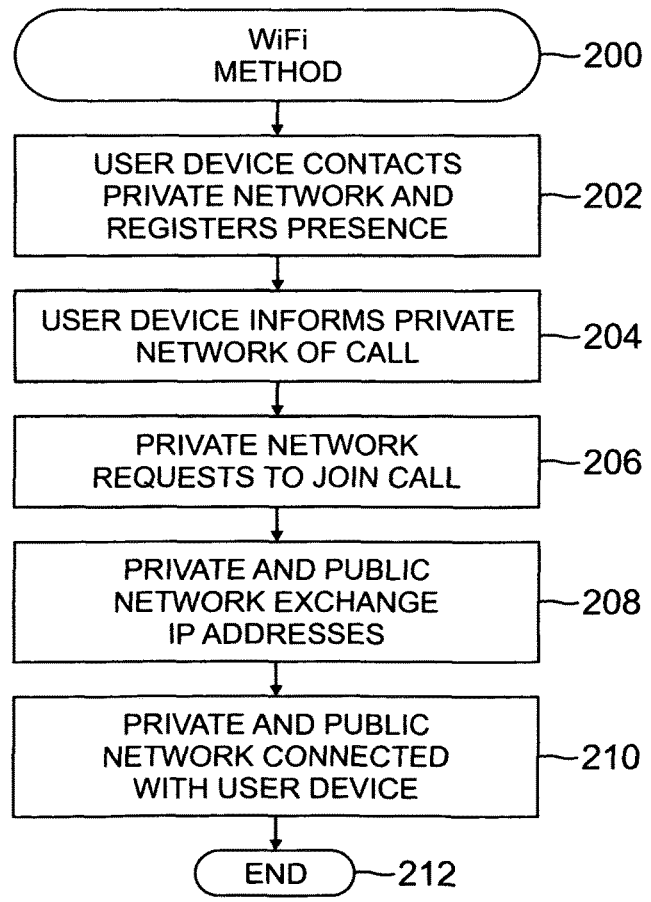
FIG. 2 is a flow chart showing illustrative processes for associating information from autonomous networks through the multiple interfaces in accordance with one or more aspects of the present disclosure.

Turning now to FIG. 1, an exemplary architecture 100 depicting seamless interworking of call control between autonomous networks 104 and 106 through multiple interfaces 108 and 110 in accordance with one or more aspects of the present disclosure is provided. Those skilled in the relevant art will appreciate that fewer or more components within the architecture 100 can be used. For purposes of illustration, two networks 104 and 106 have been shown along with a single user device 102.

Communications can take place wirelessly or through a wireline connection. A public network 104 and private network 106 have been depicted. Those skilled in the relevant art will appreciate that many types of networks can be used and are not limited to those shown in FIG. 1. These networks can include, but are not limited to, a local area network (LAN), wide area network (WAN), personal area network (PAN), campus area network (CAN), metropolitan area network (MAN), global area network (GAN) or combination thereof. Such networking environments are commonplace in office networks, enterprise-wide computer networks, intranets and the Internet, which are all types of networks.

The networks 104 and 106 can be autonomous. The networks 104 and 106 can be associated with different zones. In one embodiment, these zones can be overlapping. Each of these zones can provide specific services to its users. Controllers can be part of each of the autonomous networks 104 and 106. The controllers can enable the interconnection of the user device 102 with the networks 104 and 106 through trunks to devices in other networks.

Continuing with FIG. 1, the user device 102 can cause multiple autonomous networks 104 and 106 to be connected to the call for control and media. The device 102 can then cause these networks 104 and 106 to add and delete other parties or devices and to execute other features. The device 100 can be configured with a Graphical User Interface (GUI) to access these features and to display information coming from these autonomous networks 104 and 106.

The user device 102 can communicate with the autonomous networks 104 and 106 through multiple interfaces 108 and 110. In one embodiment, a cellular network interface 108 can be used by the device 102 to connect to the public network 104. The user device 102 can be connected to the private network 106 through a WiFi interface 110. Controllers within the networks 104 and 106 can supply or enable respective interfaces on the user device 102. These interfaces can be displayed within the GUI on the device 102.

By associating with both networks 104 and 106, collaboration services can be provided to the user device 102. Collaboration services can include, but are not limited to, associations, roles, availability and features. Collaboration services can be offered, either in whole or in part, by the public network 104 or private network 106. Features can include call handoff to devices that are associated with the public network 104 or private network 106. The services can include display of presence and availability of information from the public network 104 or private network 106. Other types of services will become apparent from the description provided below.

FIG. 2 is a flow chart showing illustrative processes for associating information from autonomous networks 104 and 106 through the multiple network interfaces 108 and 110 in accordance with one or more aspects of the present disclosure. The user can take advantage of features by originating and receiving calls from each zone. Each zone defined by the autonomous networks 104 and 106 can provide their own unique features. Existing calls can be processed using features from each zone even though the controllers and networks 104 and 106 are autonomous and unaware of each other.

As described above, the user device 102 can have both cellular and WiFi capabilities. For this illustration, it can be assumed that the user device 102 is initially distant from their private network 106. Using the device 102, the user can make a call through the public network 104 to another device through its cellular interface 108. This distant device can be either on the public network 104 or it can be a device on the user's private network 106. The user device 102 can then move within range of their private network 106. The device 102 can then handoff control of the call to the home controller associated with the private network 106 to obtain its services. The processes can begin at block 200.

At block 202, the user device 102 can contact the private network 106 and register its presence. The private network 106 can connect to the public network 104 through an SIP connection. While not essential, a basis for describing the operation of the control handoff can be implemented through SIP. The user device 102 can inform the home controller on the private network 106 that it is involved in a call and supply the home controller with the information to join the call at block 204. In one embodiment, this can be done using the standard SIP transfer feature.

The private network 106 can then request to join the call at block 206. Using the procedures defined in the SIP transfer feature, the private network 106 can provide a trunk or internal connection that can be conferenced into the call at the distant party location by the public network 104. The controller of the public network 104 can operate a feature in which a three party conference can be set up. Using the SIP transfer information supplied by the user device 102, the PBX can signal the cellular controller that it wishes to join the existing call. At block 208, the public network 104 and private network 106 can exchange IP addresses for this connection.

At block 210, the user device 102 can be connected to the public network 104 and private network 106 through their controllers. The media for the call that is associated with the user device 102 can now also be associated with both controllers through the established conference. The controllers using their respective conference capabilities can be free to add or delete endpoints to the call that are under their control. The PBX controller on the private network 106 can supply the user device 102 with a GUI or other control interface indications. The PBX can, under user direction, connect the call to one of the user's associated devices.

In addition, both autonomous networks 104 and 106 can be free to provide their features to the user device 102. The presence of roles and persons can also be provided. Features offered by the networks 104 and 106 can be executed under command of the user device 102. The user has the capability of merging the roles, identities and devices that have been made available to them by the autonomous networks 104 and 106. For example, the user can instruct the PBX to display the presence and availability information of subject matter experts and then request that such an expert be conferenced into the call. A user can exploit features, device associations, roles, classes of service, etc. from the autonomous zones that are associated with the call. The processes can end at block 212.

The description above has indicated how the private network 106 can be attached to a call originated on the public network 104. In one embodiment, a similar technique can be used to connect the public network 104 and its controller to a call originated on the private network 106. Those skilled in the relevant art will appreciate that there can be a variety of combinations by using numerous types of networks. For example, a user device 102 can be connected with multiple private networks.

Figure 3:
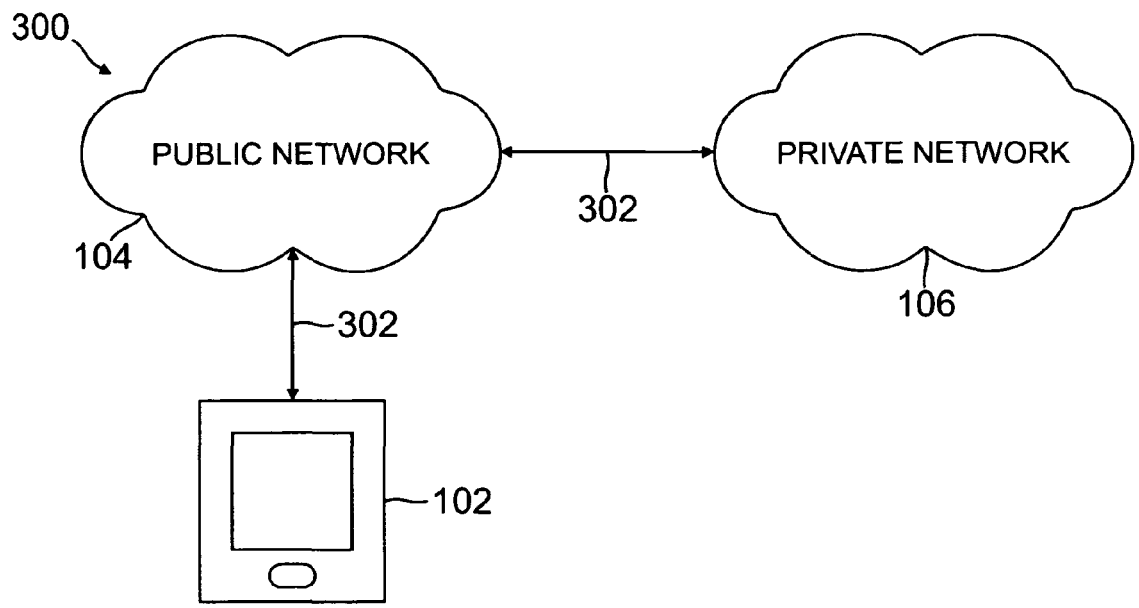
FIG. 3 is an exemplary architecture depicting seamless interworking of call control between autonomous networks through a single interface in accordance with one or more aspects of the present disclosure.

Referring now to FIG. 3, an exemplary architecture 300 depicting seamless interworking of call control between autonomous networks 104 and 106 through a single interface 302 in accordance with one or more aspects of the present disclosure is provided. Those skilled in the relevant art will appreciate that fewer or more components within the architecture 100 can be used. For purposes of illustration, two networks 104 and 106 have been shown along with a single user device 102.

The networks 104 and 106 can be autonomous. The autonomous networks 104 and 106 can be associated with different zones. Each of these zones can provide specific services to its users. Controllers can be part of each of the autonomous networks 104 and 106. The controllers can enable the interconnection of the user device 102 with the networks 104 and 106 through trunks to devices in other networks.

The user device 102 can be connected to a public network 104 and a private network 106 through the public network 104. Other devices can be connected to the autonomous networks 104 and 106 that can be part of the call. The device 102 can cause multiple autonomous networks 104 and 106 to be connected to the call for control and media. The device 102 can then cause these networks 104 and 106 to add and delete other parties or devices and to execute other features. The device 100 can be configured with a GUI to access these features and to display information coming from these autonomous networks 104 and 106.

Figure 4:
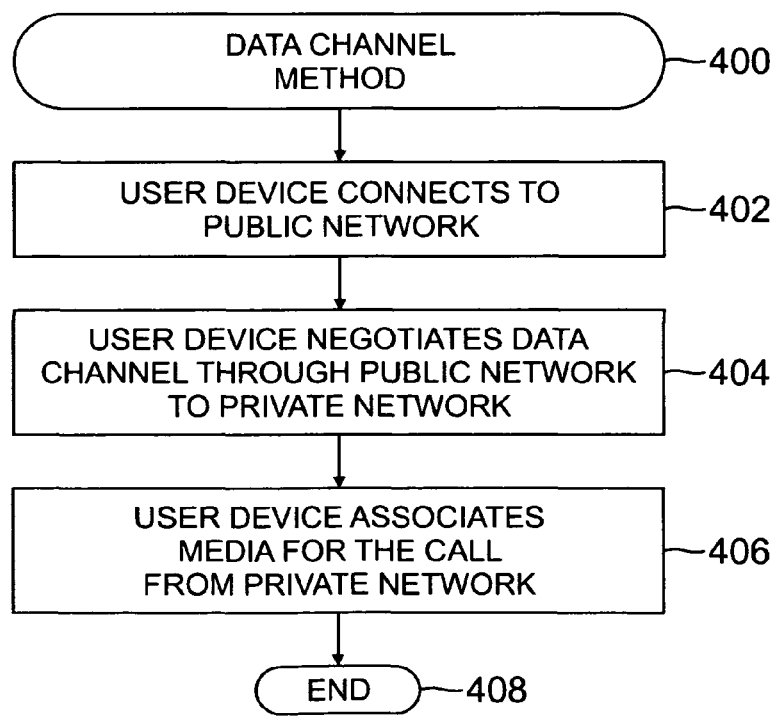
FIG. 4 is a flow chart showing illustrative processes for associating information from autonomous networks through the single interface in accordance with one or more aspects of the present disclosure.

A single network interface 302 can be presented to the user device 102. Through the interface 302, a data channel 302 can be set up through the public network 104 to the private network 106 for obtaining collaboration services. FIG. 4 is a flow chart showing illustrative processes for associating information from autonomous networks 104 and 106 through the single interface 302 in accordance with one or more aspects of the present disclosure. Those skilled in the relevant art will appreciate that fewer or more processes can be used. The processes can begin at block 400.

At block 402, the user device 102 can connect to the public network 104 through the single interface 302. Using SIP, a data channel can be negotiated through the public network 104 to the controller of the private network 106 at block 404. The device can be connected to both the public network 104 and private network 106 simultaneously. With connections to controllers of both networks 104 and 106 now available, at block 406, the user device 102 can associate media for the call from the private network 106 by use of the SIP transfer feature.

The SIP data channel to the private network 106 can enable features for the user device 102. For example, a device association feature retrieved from the private network 106 can be utilized. If the user wishes to handoff a call from their device 102 to an associated device on their private network 106, the SIP transfer feature can be used. Both controllers on the public network 104 and private network 106 can be aware of the call and endpoints in each network 104 and 106 can be added and deleted as instructed by the user. For example, the PBX on the private network 106 can be instructed to connect the call to a selected associated device. Similar to the description above, roles, identities and devices from both networks 104 and 106 can be added or deleted from the call under instruction from the user. The processes can end at block 408.

The description above indicated how the private network 106 can be attached to a call originated on the public network 104. In one embodiment, a similar technique can be used to connect the public network 104 and its controller to a call originated on the private network 106. Those skilled in the relevant art will appreciate that there can be a variety of combinations by using numerous types of networks. For example, a user device 102 can be connected with multiple private networks.

The data structures and code, in which the present disclosure can be implemented, can typically be stored on a non-transitory computer-readable storage medium. The storage can be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the disclosure can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

The technology described herein can be implemented as logical operations and/or modules. The logical operations can be implemented as a sequence of processor-implemented executed steps and as interconnected machine or circuit modules. Likewise, the descriptions of various component modules can be provided in terms of operations executed or effected by the modules. The resulting implementation is a matter of choice, dependent on the performance requirements of the underlying system implementing the described technology. Accordingly, the logical operations making up the embodiment of the technology described herein are referred to variously as operations, steps, objects, or modules. It should be understood that logical operations can be performed in any order, unless explicitly claimed otherwise or a specific order is inherently necessitated by the claim language.

Various embodiments of the present disclosure can be programmed using an object-oriented programming language, such as SmallTalk, Java, C++, Ada or C#. Other object-oriented programming languages can also be used. Alternatively, functional, scripting, and/or logical programming languages can be used. Various aspects of this disclosure can be implemented in a non-programmed environment, for example, documents created in HTML, XML, or other format that, when viewed in a window of a browser program, render aspects of a GUI or perform other functions. Various aspects of the disclosure can be implemented as programmed or non-programmed elements, or any combination thereof.

The foregoing description is provided to enable any person skilled in the relevant art to practice the various embodiments described herein. Various modifications to these embodiments will be readily apparent to those skilled in the relevant art, and generic principles defined herein can be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A method for obtaining collaboration services offered by multiple autonomous networks at a user device, the method comprising:
   communicating with a controller of a first autonomous network to connect to a call with at least one other device through said first autonomous network, the first autonomous network comprising a public network;
   during said call, communicating with a controller of the second autonomous network to register the user device with the controller of the second autonomous network, the second autonomous network comprising a private network;
   sending said controller of the second autonomous network information to join said controller of said second autonomous network to said call while said user device continues to communicate with said controller of said first autonomous network;
   simultaneously receiving first collaboration services from said controller of said first autonomous network and second collaboration services from said controller of said second autonomous network;
   wherein said first collaboration services include associations, roles, availability and features provided by said controller of said first autonomous network, and wherein said second collaboration services include associations, roles, availability and features provided by said controller of said second autonomous network;
   merging on said user device said associations, roles, availability and features provided by said controller of said first autonomous network and said controller of said second autonomous network; and
   displaying, in a graphical user interface on a display device of the user device, the merged associations, roles, availability and features;
   wherein said features include presence and availability information of persons in at least one of said roles from said first autonomous network and said second autonomous network.

2. The method of claim 1, wherein during said call the user device initiates communicating with said controller of said second autonomous network when the user device detects presence of said second autonomous network.

3. The method of claim 1, further comprising sending a request to said controller of said first autonomous network to form a data channel through said public network to said private network, and wherein communicating with said controller of said second autonomous network comprises communicating said controller of said second autonomous network via said data channel formed through said public network.

4. The method of claim 1, wherein said communication with said controller of said first autonomous network is through a first network interface and said communication with said controller of said second autonomous network is through a second network interface.

5. The method of claim 1, wherein said communication with said controllers of said first and second autonomous networks are through one network interface.

6. A device comprising:
   a display device;
   a processor; and
   a memory operatively coupled to said processor, said memory storing program instructions that when executed by said processor, causes said processor to:
   communicate with a first autonomous controller of a public network to connect to a call with at least one other device through the said public network;

during said call, communicate with a second autonomous controller of a private network to resister the device with the second autonomous controller of said private network;

send the second autonomous controller of said private network information to join said second autonomous controller to said call while the device continues to communicate with said controller of said first autonomous network;

simultaneously receive first collaboration services from said first autonomous controller of said public network and second collaboration services from said second autonomous controller of said private network, wherein said first collaboration services include associations, roles, availability and features provided by the first autonomous controller of said public network, and wherein said second collaboration services include associations, roles, availability and features provided by the second autonomous controller of said private network;

merge said associations, roles, availability and features provided by said first autonomous controller and said second autonomous controller; and display, in a graphical user interface on said display device, said merged associations, roles, availability and features;

wherein said features include presence and availability information of persons in at least one of said roles from said first autonomous network and said second autonomous.

7. The device of claim 6, wherein said communication with said first and second autonomous controllers are through one network interface.

8. The device of claim 6, wherein said communication with said first controller is through a first network interface and said communication with said second autonomous controller is through a second network interface.

9. The device of claim 6, wherein said memory storing said program instructions that when executed by said processor cause said processor to:

send a request to said controller of said first autonomous network to form a data channel through said public network to said private network, and communicate with said second autonomous controller via said data channel formed through said public network.

10. The device of claim 6, wherein said memory storing said program instructions that when executed by said processor cause said processor to, during said call, initiate communication with said controller of said second autonomous network when the user device detects said second autonomous network.

* * * * *

UNITED STATES PATENT AND TRADEMARK OFFICE
CERTIFICATE OF CORRECTION

Page 1 of 1

PATENT NO. : 9,674,349 B2
APPLICATION NO. : 13/317478
DATED : June 6, 2017
INVENTOR(S) : Yeung and Gray It is certified that error appears in the above-identified patent and that said Letters Patent is hereby corrected as shown below:

In the Claims

Column 10, Lines 3 and 4, "said first autonomous network and said second autonomous" should be "said first autonomous network and said second autonomous network".

Signed and Sealed this
Third Day of October, 2017

Joseph Matal
*Performing the Functions and Duties of the*
*Under Secretary of Commerce for Intellectual Property and*
*Director of the United States Patent and Trademark Office*